(12) United States Patent
Braun

(10) Patent No.: US 11,136,123 B2
(45) Date of Patent: Oct. 5, 2021

(54) METHODS AND SYSTEMS FOR STORING CONTENT FOR A VEHICLE ENTERTAINMENT SYSTEM

(71) Applicant: Panasonic Avionics Corporation, Lake Forest, CA (US)

(72) Inventor: Peter Braun, Foothill Ranch, CA (US)

(73) Assignee: Panasonic Avionics Corporation, Lake Forest, CA (US)

(*) Notice: Subject to any disclaimer, the term of this patent is extended or adjusted under 35 U.S.C. 154(b) by 0 days.

(21) Appl. No.: 16/664,570

(22) Filed: Oct. 25, 2019

(65) Prior Publication Data

US 2020/0070983 A1 Mar. 5, 2020

Related U.S. Application Data

(63) Continuation-in-part of application No. 16/150,143, filed on Oct. 2, 2018, which is a continuation-in-part (Continued)

(51) Int. Cl.
*H04N 21/414* (2011.01)
*B64D 11/00* (2006.01)
(Continued)

(52) U.S. Cl.
CPC ......... *B64D 11/00155* (2014.12); *G06F 8/61* (2013.01); *H04N 21/2146* (2013.01);
(Continued)

(58) Field of Classification Search
CPC .... B64D 11/00155; H04W 4/42; H04W 4/80; G06F 8/61; H04N 21/2146; H04N 21/266;
(Continued)

(56) References Cited

U.S. PATENT DOCUMENTS 5,208,665 A 5/1993 McCalley et al.
5,404,567 A 4/1995 DePietro et al.
(Continued)

FOREIGN PATENT DOCUMENTS

WO WO2008/029053 3/2008
WO WO2017/075386 5/2017

OTHER PUBLICATIONS

Notice of Allowance from USPTO dated Oct. 9, 2020 for U.S. Appl. No. 16/803,188.
(Continued)

*Primary Examiner* — Gims S Philippe
*Assistant Examiner* — Alexander Boyd
(74) *Attorney, Agent, or Firm* — Klein, O'Neill & Singh, LLP

(57) ABSTRACT

Networking methods and systems are provided for a transportation vehicle with seat devices. One method includes detecting operational software installation for a first seat device to access an entertainment system with media files of a virtual local storage (VLS) media set distributed across storage of a portion of the seat devices; identifying a second seat device configured to store the operational software in a downloadable configuration; providing the operational software in the downloadable configuration to the first seat device; installing the operational software at the first seat device; determining that the first seat device is a member of the VLS media set, based on a location of the first seat; transmitting a portion of the VLS media set from one or more seat devices to the first seat device; and persistently storing the portion of the VLS media set at persistent storage of the first seat device.

20 Claims, 8 Drawing Sheets

Related U.S. Application Data of application No. 16/003,995, filed on Jun. 8, 2018, now Pat. No. 10,728,587.

(51) Int. Cl.

| | |
|---|---|
| *H04N 21/214* | (2011.01) |
| *G06F 8/61* | (2018.01) |
| *H04W 4/80* | (2018.01) |
| *H04W 4/42* | (2018.01) |
| *H04N 21/266* | (2011.01) |
| *H04N 21/81* | (2011.01) |
| *H04N 21/433* | (2011.01) |

(52) U.S. Cl.
CPC ..... *H04N 21/266* (2013.01); *H04N 21/41422* (2013.01); *H04N 21/433* (2013.01); *H04N 21/8166* (2013.01); *H04W 4/42* (2018.02); *H04W 4/80* (2018.02)

(58) Field of Classification Search
CPC ........... H04N 21/41422; H04N 21/433; H04N 21/8166
See application file for complete search history.

(56) References Cited

U.S. PATENT DOCUMENTS

| | | | |
|---|---|---|---|
| 5,973,722 | A | 10/1999 | Wakai et al. |
| 6,061,720 | A | 5/2000 | Karmel et al. |
| 6,192,416 | B1 | 2/2001 | Baxter |
| 7,103,324 | B2 | 9/2006 | Sanford et al. |
| 7,404,201 | B2 | 7/2008 | Takeuchi et al. |
| 7,620,364 | B2 | 11/2009 | Higashida et al. |
| 7,984,190 | B2 | 7/2011 | Rhoads |
| 8,171,337 | B2 | 5/2012 | Peters et al. |
| 8,283,801 | B2 | 10/2012 | Petipierre |
| 8,442,989 | B2 | 5/2013 | Massoulie et al. |
| 8,667,544 | B2 | 3/2014 | Bird et al. |
| 8,689,264 | B2 | 4/2014 | Petrisor |
| 9,043,846 | B2 | 5/2015 | Cline et al. |
| 9,210,450 | B2 | 12/2015 | Healy et al. |
| 9,226,000 | B1 | 12/2015 | Knight |
| 9,313,527 | B2 | 4/2016 | Couleaud et al. |
| 9,571,863 | B2 | 2/2017 | Healy et al. |
| 10,390,053 | B2 | 8/2019 | Boussemart et al. |
| 10,897,652 | B1 | 1/2021 | Atkins et al. |
| 2005/0256616 | A1 | 11/2005 | Rhoads |
| 2006/0143662 | A1 | 6/2006 | Easterling et al. |
| 2006/0206565 | A1 | 9/2006 | Ganesan et al. |
| 2006/0271970 | A1 | 11/2006 | Mitchell et al. |
| 2009/0024754 | A1 | 1/2009 | Setton et al. |
| 2009/0034540 | A1 | 2/2009 | Law |
| 2009/0130971 | A1* | 5/2009 | Piekarski ............. G06F 8/65 455/3.01 |
| 2009/0138920 | A1 | 5/2009 | Anandpura |
| 2011/0219409 | A1 | 9/2011 | Frisco et al. |
| 2012/0167148 | A1 | 6/2012 | Healy et al. |
| 2012/0210372 | A1 | 8/2012 | Kaufmann et al. |
| 2013/0055321 | A1 | 2/2013 | Cline et al. |
| 2013/0067330 | A1 | 3/2013 | Naik et al. |
| 2014/0032660 | A1 | 1/2014 | Nguyen |
| 2015/0046646 | A1 | 2/2015 | Elzind |
| 2015/0245109 | A1 | 8/2015 | Couleaud et al. |
| 2016/0248831 | A1 | 8/2016 | Watson et al. |
| 2016/0330489 | A1 | 11/2016 | Dame |
| 2017/0048558 | A1 | 2/2017 | Koupsin et al. |
| 2018/0027070 | A1 | 1/2018 | Jhanji et al. |
| 2018/0034911 | A1 | 2/2018 | Bedekar |
| 2018/0220196 | A1 | 8/2018 | Slater et al. |

OTHER PUBLICATIONS

Loureiro, Renzo Z. & Anzaloni, Alessandro, "Searching Content on Peer-to-Peer Networks for In-Flight Entertainment", Aerospace Conference, 2011 IEEE, Mar. 5-12, 2011.
Office Action from Patent Office of the Russian Federation dated Feb. 20, 2019 for Russian Application No. 2015125533.
Office Action from USPTO dated Dec. 3, 2019 for U.S. Appl. No. 16/150,143.
Notice of Allowance from USPTO dated Jan. 29, 2020 for U.S. Appl. No. 16/003,995.
Notice of Allowance from USPTO dated Feb. 5, 2020 for U.S. Appl. No. 16/125,146.
Notice of Allowance from USPTO dated Apr. 1, 2020 for U.S. Appl. No. 16/003,995.
Notice of Allowance from USPTO dated Apr. 2, 2020 for U.S. Appl. No. 16/125,146.
Final Office Action from USPTO dated Apr. 13, 2020 for U.S. Appl. No. 16/150,143.
Office Action from USPTO dated Feb. 7, 2018 for U.S. Appl. No. 15/145,604.
Final Office Action from USPTO dated May 7, 2018 for U.S. Appl. No. 15/145,604.
Notice of Allowance from USPTO dated Jul. 6, 2018 for U.S. Appl. No. 15/145,604.
Office Action from USPTO dated May 14, 2019 for U.S. Appl. No. 16/003,995.
Final Office Action from USPTO dated Sep. 26, 2019 for U.S. Appl. No. 16/003,995.
Office Action from USPTO dated Jul. 11, 2019 for U.S. Appl. No. 16/125,146.
Final Office Action from USPTO dated Oct. 16, 2019 for U.S. Appl. No. 16/125,146.
Office Action from China National Intellectual Property Administration dated Apr. 2, 2019 for related Chinese Application No. 201510359186.4.
Notice of Allowance from USPTO dated Oct. 5, 2020, 2020 for U.S. Appl. No. 16/150,143.
Office Action from USPTO dated Sep. 11, 2020 for U.S. Appl. No. 16/803,188.
Office Action from USPTO dated May 19, 2021 for U.S. Appl. No. 16/888,313.

* cited by examiner

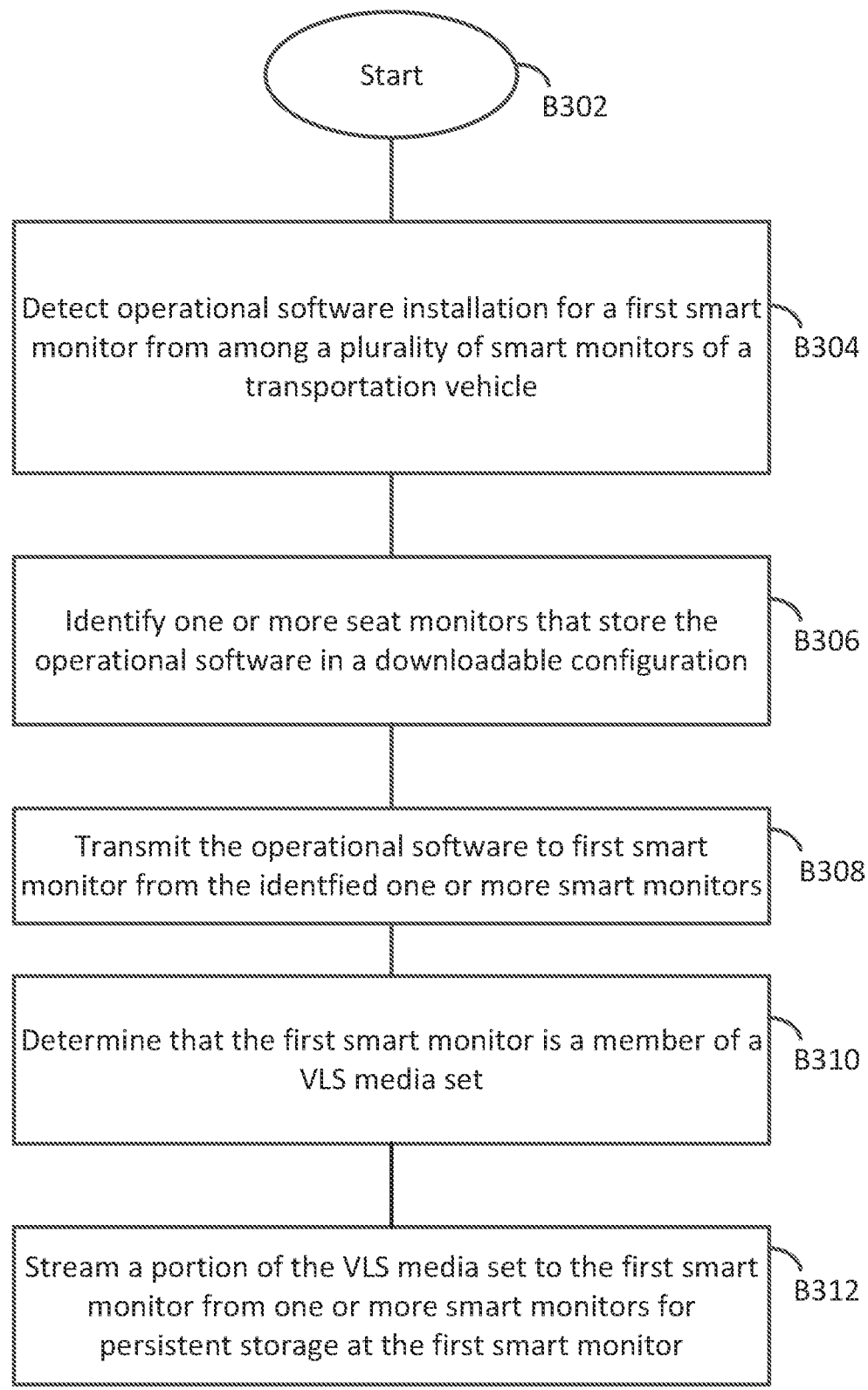

METHODS AND SYSTEMS FOR STORING CONTENT FOR A VEHICLE ENTERTAINMENT SYSTEM

CROSS-REFERENCE TO RELATED APPLICATION

This patent application is a continuation-in-part (CIP) of co-pending patent application Ser. No. 16/150,143, filed on Oct. 2, 2018, entitled, "METHODS AND SYSTEMS FOR SELECTIVE MEDIA DISTRIBUTION FOR A VEHICLEENTERTAINMENT SYSTEM," now U.S. Pat. No. 10,924,770, which is a continuation-in-part of Ser. No. 16/003,995, filed on Jun. 8, 2018, now U.S. Pat. No. 10,728,587, the disclosures of which are incorporated herein by reference in their entireties.

TECHNICAL FIELD

The present disclosure relates generally to vehicular entertainment systems, and in particular to storing operational software and content at seat devices of a vehicular entertainment system.

BACKGROUND

Entertainment systems for vehicles used in commercial passenger transport are frequently server-based. Specifically, a server stores content, e.g., media files, and provides the content via a network upon demand from client devices operated by users or passengers on the vehicle. Most often, the content is in the form of video and audio files of a media library, which are streamed to the client devices over the network. Accordingly, in conventional systems, the server is central to the operation of the entertainment system. For this reason, server-based systems in the in-flight entertainment field (IFE) are sometimes referred to as server-centric, or centralized AVOD (Audio-Video On Demand) server systems. A disadvantage of server centric systems is that if the server becomes inaccessible, the content stored on the server likewise becomes inaccessible for passengers or users of the client devices. Another disadvantage is the cost of a media server can be prohibitive. Furthermore, media servers increase the weight of an aircraft and hence are undesirable.

Other types of IFE systems store content in client devices. In particular, IFE systems typically have client devices mounted at each seat for use by passengers. These systems are sometimes referred to in the IFE field as seat-centric, or distributed AVOD server systems. Seat-centric systems have an advantage in that they are not reliant on a (centralized) server to provide AVOD services to passengers. However, if a client device becomes unavailable due to a malfunction and has to recover operational software and media content, the current state of the art still relies on a centralized server to provide the media content. Continuous efforts are being made to develop technology for efficiently loading operational software and media files onto seat devices in absence of a centralized server.

SUMMARY

In one aspect, methods and systems for a transportation vehicle are provided. As an example, one method includes detecting operational software installation for a first seat device of a plurality of seat devices of the transportation vehicle to access an entertainment system of the transportation vehicle, the entertainment system comprising a plurality of media files stored within a virtual local storage (VLS) media set distributed across persistent storage of at least a portion of the plurality of seat devices without using persistent mass storage of a centralized server on the transportation vehicle; identifying at least a second seat device configured to store the operational software in a downloadable configuration; providing the operational software in the downloadable configuration from the second seat device to the first seat device; installing the operational software at the first seat device; determining that the first seat device is a member of the VLS media set, based on a location of the first seat at the transportation vehicle; transmitting a portion of the VLS media set from one or more seat devices to the first seat device; and persistently storing the portion of the VLS media set at the persistent storage of the first device.

This brief summary has been provided so that the nature of the disclosure may be understood quickly. A more complete understanding of the disclosure can be obtained by reference to the following detailed description of the various aspects thereof concerning the attached drawings.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 3 shows a process flow for using smart monitors to provide operational software and media files to another smart monitor, according to one aspect of the present disclosure;

DETAILED DESCRIPTION

Figure 1A:
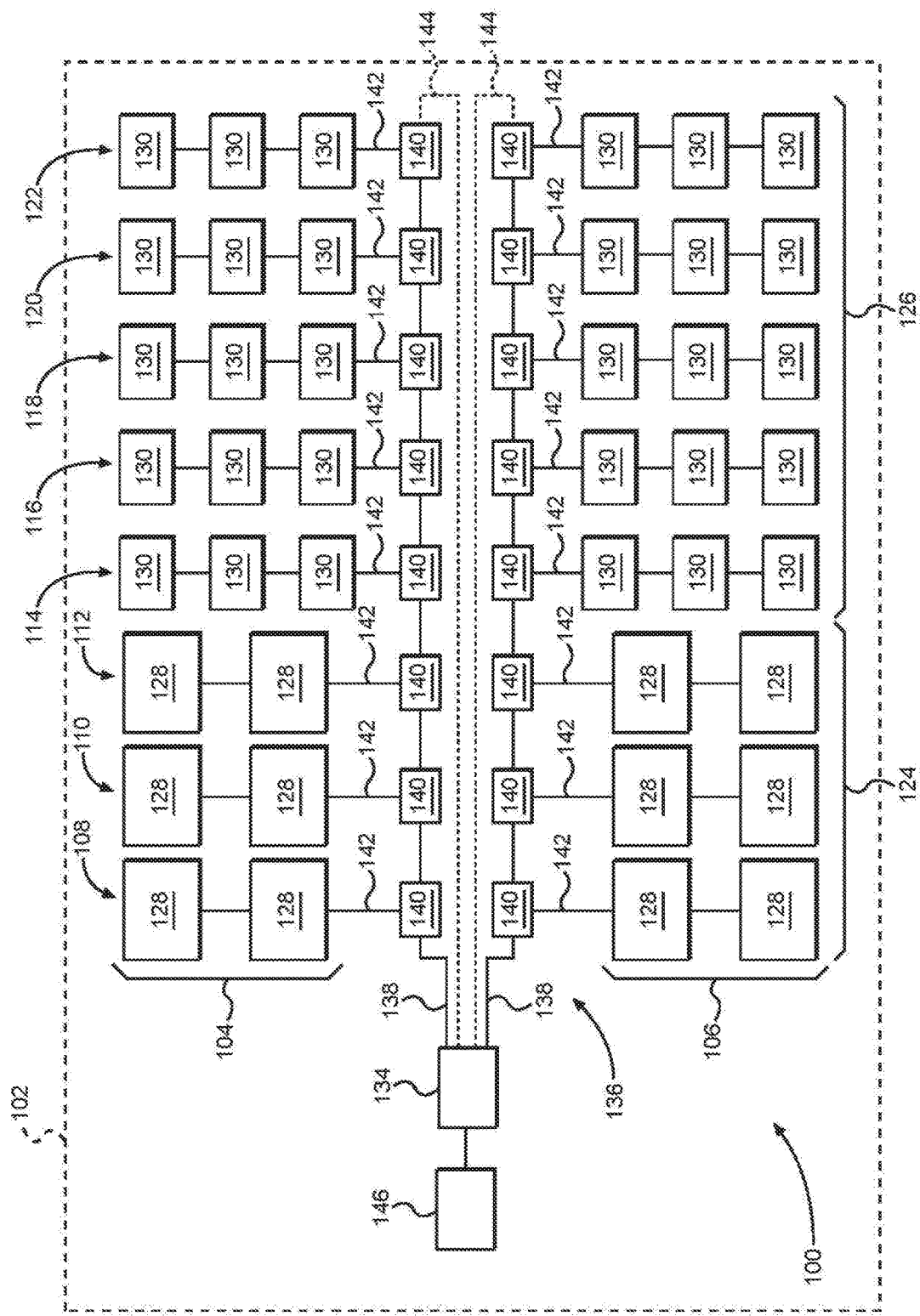
FIG. 1A is a schematic diagram of a vehicle entertainment system of a transportation vehicle, according to one aspect of the present disclosure.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a computing device and the computing device itself can be a component. One or more components may reside within a process and/or thread of execution, and a component may be localized on one computing device and/or distributed between two or more computing devices. Also, these components can execute from various computer readable media having various data structures stored thereon. The components may communicate via local and/or remote processes such as in accordance with a signal having one or more data packets (e.g., data from one component interacting with another component in a local system, distributed system, and/or across a computing network with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Described in the following paragraphs are various aspects of the present disclosure. The various aspects are implemented via a combination of hardware and software that include computing or information processing equipment having one or more processors configured to execute program logic or software stored on computer readable tangible, non-transitory storage media, e.g., magnetic memory discs, RAM, ROM, flash memory or solid state drives (SSDs). The program logic preferably configures the information processing equipment to provide the functionality as described herein.

In one aspect, innovative technology is provided for a "headless system" on a transportation vehicle. The term headless system as used herein refers to a system of a transportation vehicle that does not use a centralized server or computing system of conventional systems for storing operational software, vehicle configuration information as well as media files of a media library. The disclosed technology for the headless system initially distributes and installs operational software from a network device directly to seat devices without a centralized server. Media files for a virtual local storage ((VLS), described below in detail) are also transferred to the seat devices. If a seat device is replaced/repaired, the innovative technology disclosed herein enables recovery of the operational software (including vehicle configuration information) and media files from one or more seat devices that may also be referred to as a "collective" of seat devices.

System 100: FIG. 1A schematically illustrates a vehicle entertainment system 100 disposed in a vehicle 102 without a centralized server. The type of vehicle 102 is not limited and may be any kind of vehicle for carrying passengers, for example, an aircraft, bus, train, boat, submarine or spaceship. In this example, the vehicle 102 includes two seat columns 104 and 106 arranged symmetrically from one another across an aisle as typical in vehicles used for passenger transport. Each column 104 and 106 includes seat rows 108 through 122 extending generally orthogonally away from the aisle between the columns. It should be appreciated that FIG. 1A is a schematic drawing for explanatory purposes and passenger transport vehicles, such as aircraft used for commercial passenger transport, which can have hundreds of seats and consequently many more columns and rows than that illustrated in FIG. 1A.

The seat rows 108 through 122 may have different number of seats depending on the class of seating of 124 and 126. For example, seat rows 108 through 112 nearer the front of the vehicle 102 may be premium class seating 124, such as business or first class and have larger seats 128 and/or more spacing between the seats 128. Seat rows 114 through 122 further back in the vehicle 102 may be economy class 126 and have smaller seats 130 and/or less spacing between the seats. Often a bulkhead, not shown, separates one class of seating 124 and 126 from another.

Figure 1B:
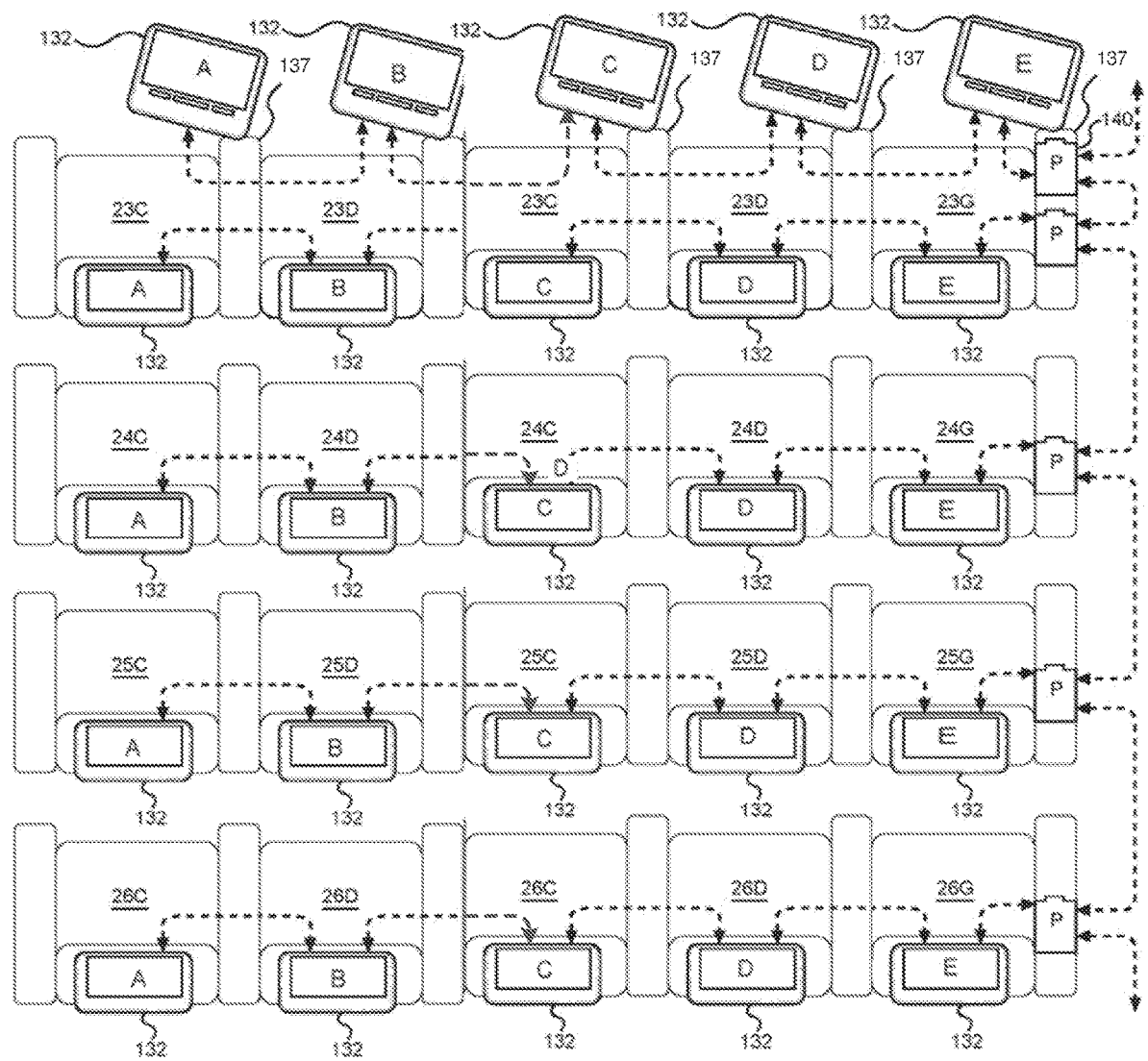
FIG. 1B illustrates a portion of a vehicle entertainment system.

FIG. 1B schematically illustrates a portion or a vehicle having rows of seats and an entertainment system that includes smart monitors 132 (SMs), sometimes also called media play-ers, video monitors, video display units or seat devices (for clarity of explanation the smart monitors 132 are not shown in FIG. 1A). Typically, a smart monitor 132 is mounted to the back of each seat for viewing by a passenger or user in the seat immediately behind the seat to which the smart monitor 132 is mounted. For a seat for which there is no seat forward thereof, the smart monitor 132 is frequently mounted to a bulk head in front of the seat. Alternatively, such a smart monitor 132 mounts to a seat arm 137 and is retractable into the seat arm when not in use. The adaptive aspects of the present disclosure are not limited to any specific location/position of the smart monitors 132.

The hardware for the smart monitors 132 is preferably of conventional design for use on transportation vehicles. For example, smart monitors sold by Panasonic Avionics Corporation of Lake Forest, Calif., may be used. Smart monitors of other types and from other manufacturers may be used as well. The adaptive aspects disclosed herein are not limited to any particular smart monitor type. The smart monitors 132 as described herein include software or program logic to perform as described in connection with the flow charts shown in FIG. 3. The smart monitors 132 are configured with software or program logic to present media selections to passengers or users, corresponding to media files that are stored (locally) at the smart monitors 132 or at a plurality of smart monitors, using one or more virtual local storage (VLS) media sets or subsets. In addition, the smart monitors 132 stream one or more files therefrom to another smart monitor from one or more smart monitors via a request communicated over a network.

Each smart monitor 132 can store a subset of the total media library of the vehicle. For example, as indicated in FIG. 1B, the smart monitors 132 for passengers/users in row 23 are loaded with a media subset A. Since these smart monitors are in the first row, these are smart monitors 132 that mount to a seat arm 137. Media subset B is loaded into the smart monitors 132 for the users/passengers in row 24. These are the smart monitors 132 mounted to the back of the seats in row 23. The smart monitors 132 for the users/passengers in row 25 are loaded with media subset C, and so on. In total, five media subsets A, B, C, D and E are illustrated in FIG. 1B as an illustrative non-limiting example. The media subsets A, B, C, D and E are part of a VLS set described below in more detail.

Referring back to FIG. 1A, as an example, the media files are initially loaded from a loading device (e.g. 418, FIG. 4) to the various smart monitors 132 via an interface 134, without a centralized server. In one aspect, interface 134 is a networked routing device that does not persistently store media files and instead pumps and distributes media files from the portable loading devices to the various smart monitors 132. Usually, the portable media loader stores the media files in a non-volatile memory, such as an SSD. The stored media is transferred from the portable loader to the smart monitors via interface 134 using a network connection. Wired connection compared to wireless connections currently provide the fastest loading times. Alternatively, the media may be transferred via a wireless connection, such as a satellite connection, ground station-to-vehicle, BLUETOOTH, cellular, or Wi-Fi.

Media is distributed via the cabin seat network and loaded on to the smart monitors 132 in multiple, parallel multicast streams using Internet Group Multicast Protocol (IGMP) to load each media subset to the smart monitors 132. Generally, each smart monitor 132 in a row will have a different media subset. In an alternative configuration, each media subset may be identical in each smart monitor 132 of a seat sub-network or LAN, i.e., all of the smart monitors 132 for the seats in row 23 have media subset A. This is so that the seat box 140 for the row 23 can load all of the same media files to the smart monitors 132 connected thereto. Using multicast streams minimizes the load time as multiple smart monitors take in the same VLS media subset. For a LINUX system, multiple Network Block Device channels are formed that operate simultaneously to transfer the media files via interface 134 to the smart monitors 132.

In one aspect, system 100 includes a network 136 that connects the smart monitors 132 and interface 134 in communication with one another. The network 136 is preferably a conventional local area network (LAN) using Ethernet for communication between the smart monitors 132 and interface 134. The network includes higher speed sub-networks 138 extending from the interface 134 along the columns 104 and 106. Preferably, the higher speed sub-networks 138 provide throughput of at least gigabyte Ethernet using conventional 2.5GBase-T, 1000BASE-T, Copper-Gigabit wiring/cabling, or CAT5e. The higher speed sub-networks 138 are referred to hereinafter as column sub-networks 138.

The column sub-networks 138 connect to seat boxes 140 that include a switch. The term seat box as used herein includes switches that provide both power and network connections for the smart monitors 132 and switches that provide only network connections. A lower speed data sub-network 142 may extend from each seat box 140 and extends along the nearest row of seats thereto (seat rows 108, 110, 112, 114, 116, 118, 120, or 122). The lower speed sub-networks 142 may each provide at least 100 megabytes per second of throughput via conventional Fast Ethernet connections using 100BASE-TX wiring. The lower speed sub-networks 142 form seat LANs or seat sub-networks of at least two smart monitors 132, as opposed to the earlier described column sub-networks 138. The various adaptive aspects described herein are not limited to any particular network protocol or network operating speed.

In one aspect, the seat boxes 140 supply both network connections and power to the smart monitors 132 connecting thereto. Each seat box 140 includes a processor and memory, in which the processor executes software or program logic. The seat boxes may be of conventional hardware and are frequently referred to in the in-flight entertainment field as Power-Network Boxes (PNBs) as the seat boxes 140 provide both power and network connections. Alternatively, the seat boxes 140 may be referred to as Seat Interface Boxes (SIBs). If larger smart monitors are used, such as smart monitors sold under the trademarks of NEXT, ELITE SERIES V2, and ALTUS by Panasonic Avionics Corporation, the seat boxes 140 may provide network connections only, with power provided separately via seat electrical boxes or seat power modules (SPMs). Power Network Boxes, Seat Interface Boxes, Seat Electrical Boxes and Seat Power Modules are all available from Panasonic Avionics Corporation.

Optionally, the network 138 may include a redundant communication connection or connections 144 for use in the event of a communication path failure. In this regard, a pathway failure along either column sub-network 138 would cut communications between the interface 134 and smart monitors 132 in that column 104 or 106 for seats 128 and 130 downstream of the failure. Therefore, a redundant communication connection 144 may extend between the last seat box 140 in each column 104 and 106 and the interface 134. The redundant communication connection 144 provides an alternative communication path in the event of a failure in a column sub-network 138 to prevent smart monitors 132 from being cut off from communication with the interface 134.

In one aspect, the redundant communication connections 144 provide full communication redundancy and provide gigabyte Ethernet using conventional 2.5GBase-T, 1000BASE-T or Copper-Gigabit wiring/cabling. For cost reduction, the redundant communication connections 144 may be lower data rate connections and reserved only for public announcements. In this regard, the entertainment system 100 includes an interface or crew terminal 146 for use by vehicle personnel to control the entertainment system 100 and communicate public announcements to the smart monitors 132. Redundant communication connections 144 provide for an alternative way to broadcast public announcements to the smart monitors 132 in the event of a communication failure.

In one aspect, instead of wired connections, smart monitors 132 could wirelessly connect over a network either directly with one another or indirectly via a wireless access point. The communication standard could be according to the 802 family (Wi-Fi), BLUETOOTH standard, or other communication standards. If a wireless access point is provided, it could have local content storage and act as another source of media files should a connectivity failure occur.

Figure 2A:
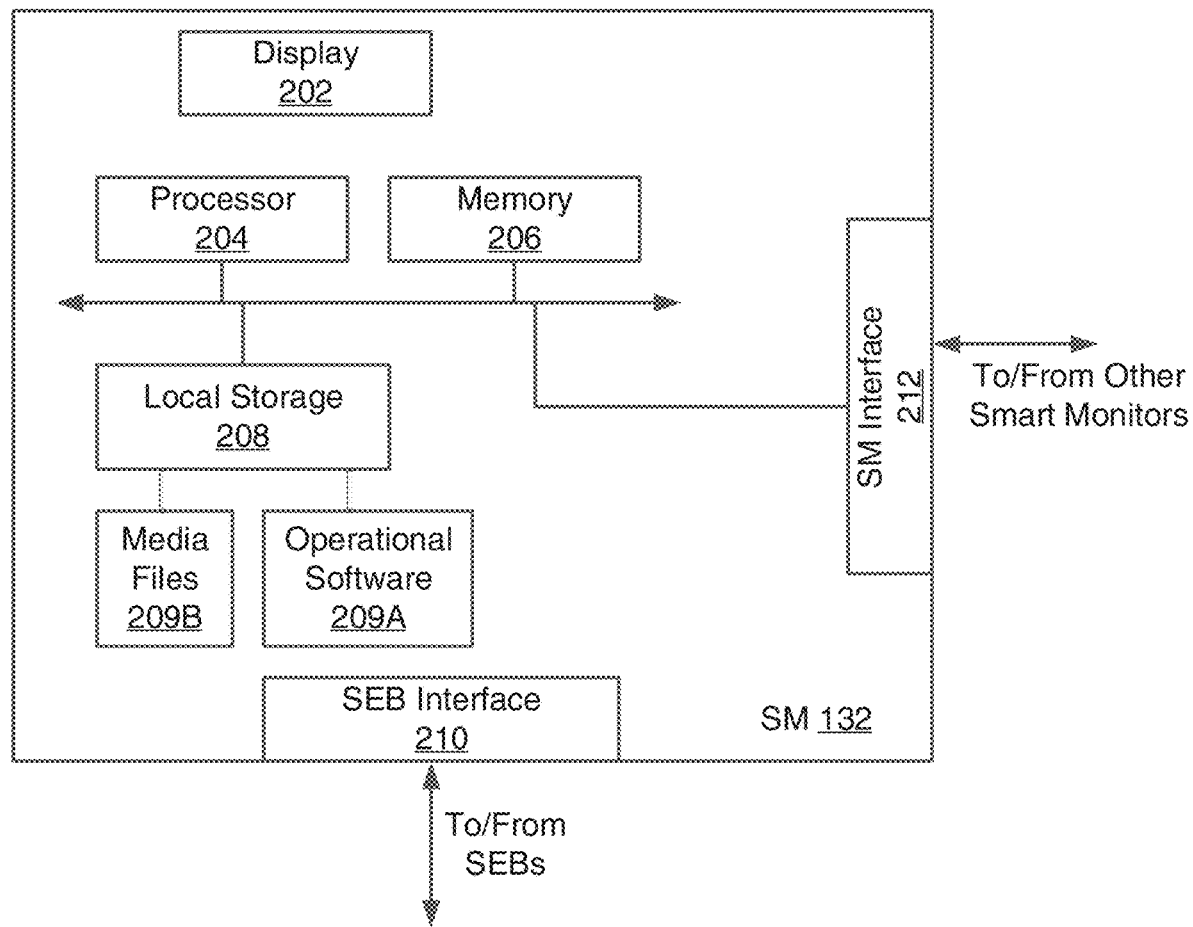
FIG. 2A shows an example of a smart monitor, used according to one aspect of the present disclosure.

Smart Monitor 132: FIG. 2A shows a block diagram of a smart monitor 132 for using persistent storage for storing operational software and media files of a VLS, according to one aspect of the present disclosure. The term operational software as used throughout this specification means instructions for operating a smart monitor and may include a clone version of the operational software as well vehicle specific configuration. Smart monitor 132 includes a display screen 202 to display content. Smart monitor 132 includes one or more processors 204 with access to a memory 206. Processor 204 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 206 represents any form of random access memory (RAM), read-only memory (ROM), flash memory, or the like, or a combination of such devices.

Memory 206 includes executable instructions for managing the overall operations of the smart monitor 132. In one aspect, processor 204 executes an operating system based on AN-DROID out of memory 206. However, other operating systems could be used, such as LINUX or proprietary operating systems available from Microsoft Corporation of Redmond, Wash. or Apple Inc. of Cupertino, Calif., which respectively sell operating systems under the trademarks of WINDOWS and IOS (without derogation of any trademark rights).

In one aspect, the smart monitor 132 includes a local storage device 208, e.g. a non-volatile memory device for storing operational software 209A and media files 209B. The local storage device includes a memory card according to the Secure Digital standard, i.e., an SD flash memory card. In particular, ECO smart monitors currently available from Panasonic Avionics Corporation (without derogation of any trademark rights) have SD cards according to the eXtended-Capacity standard, i.e., SDXC flash memory cards. The operational software 209A may include software instructions for enabling the smart monitor 132 to access and display media files 209B. Processor 204 executes the operational software 209A from memory 206.

Smart monitor 132 may also include a smart monitor interface 212 that enables communication with other smart monitors. In one aspect, interface 212 includes logic and circuit to support inter-smart monitor communication, i.e., communication from one smart monitor to another. The communication may use a wired network connection or wireless connection. The smart monitor communication is not limited to any specific network communication type, network protocol or operating speed.

When connected to a seat box 140, smart monitor 132 includes a seat electronic box (SEB) interface 210 with logic and circuitry to communicate with seat box 140. The connection with seat box 140 may be wired or wireless.

A media library having a plurality of media files is used to present content at the transportation vehicle. The number of media files stored by the smart monitor 132 is based on the storage capacity of the storage device 208 and the size of the media file (note: the media file size depends on the movie resolution (e.g. 1080p vs. 4 k) and the type of encoding). The number of media files in the media library is based on the size of the individual movies and the available storage capacity of the storage device 208 multiplied by the number of AVOD streams a smart monitor can provide to other smart monitors, referred to as the VLS factor (VLSF). The size of a given media title typically depends on its resolution and encoding. The VLSF factor depends on the processing capability of processor 204 and the available network bandwidth of the cabin seat network 138. For example, the VLSF is affected by the number of streams that a smart monitor can stream to other smart monitors with acceptable quality, while playing a video stream with acceptable quality for the passenger currently using the smart monitor and perform other functions for the passenger. In one aspect, the VLS media library size for the transportation vehicle is based on: storage capacity of the smart monitor*VLSF. For example, if the VLSF is 15 and the storage capacity is 200 GB (gigabytes), then the total VLS capacity to store media files is 15*200=3 TB (terabytes). If an average media file (for example, a movie) is 5 GB and a given VLS capacity of 3 TB, then the media library accommodates a total of 600 movies. In this model, any of the 600 movies can be watched by all passengers at the same time (i.e. 100% AVOD coverage). As an example, the media library size (i.e. the number of different media files) may be expanded by categorizing media files into one of three (3) different AVOD coverage models, or categories (i.e. 100%, 50% and 25% AVOD coverage), as described in U.S. patent application Ser. No. 16/150,143 filed on Oct. 10, 2018, and Ser. No. 16/003,995, filed on Jun. 8, 2018, the disclosures of which are incorporated herein by reference in their entirety.

Figure 2B:
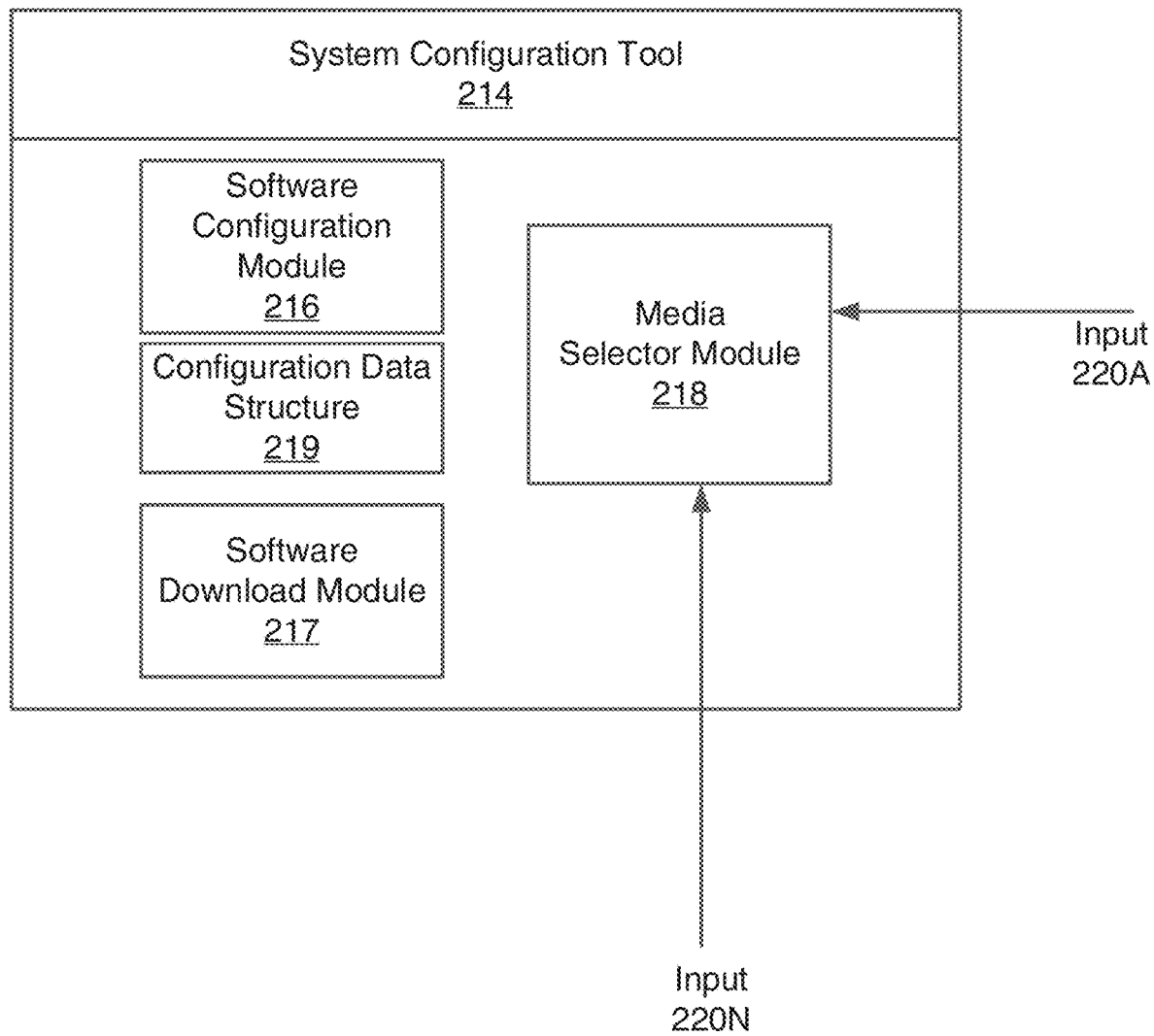
FIG. 2B shows an example of a virtual local storage (VLS) configuration tool, according to one aspect of the present disclosure.

System Configuration Tool 214: In one aspect, computing technology is provided to enable persistent storage of the operational software and media files at persistent storage devices of smart monitors 132. The computing technology maybe implemented as a processor executable system configuration tool 214 shown in FIG. 2B. The system configuration tool 214 includes a software configuration module 216 (may also be referred to as module 216), a software download module 217 (may also be referred to as module 217), and a media selector module (may also be referred to as "media selector") 218. The software configuration module 216 assigns smart monitors to store specific media files based on a media category. The media selector 218 receives a plurality of inputs 220A-220N, based on which media files can be assigned/re-assigned to a particular smart monitor. The software download module 217 assists in downloading media files and operational software to one or more smart monitors, as described below in detail. It is noteworthy that although software download module 217 is shown as a single block, it may be implemented with sub-components, where a first component is used for transferring operational software and a second component is used for transferring media files.

In one aspect, a configuration data structure 219 (referred to as data structure 219) is maintained by the software configuration module 216 at a storage device. The data structure 219 identifies each smart monitor that is operational, and includes an identifier identifying the operational software for each smart monitor type; smart monitors that store a portion of a VLS media set, the media files within the VLS media set and the media files that are individually stored at each smart monitor. In one aspect, the data structure 219 is maintained as a relational SQL database or a NO-SQL database. The adaptive aspects disclosed herein are not limited to any specific database type.

In one aspect, the system configuration tool 214 may be executed at the transportation vehicle. For example, the system configuration tool 214 is executed at one or more smart monitors 132 or on an overhead monitor (not shown). The software download module 217 detects when a smart monitor needs operational software installation and/or media files as part of a VLS media set. The software download module 217 may detect a new smart monitor (or a repaired smart monitor that is reset to factory specifications) at a passenger seat based on a discovery packet that is transmitted by the new smart monitor. The discovery packet may include a field (or flag) indicating to the system configuration tool 214 that the new smart monitor does not have the operational software 209A. The software download module 217 using the data structure 219 identifies a smart monitor that stores the operational software in a downloadable format. The software downloadable module 217 then notifies the identified smart monitor to transmit the operational software to the new smart monitor.

In another aspect, the software downloadable module 217 uses the data structure 219 to determine that the new smart monitor needs to store certain media files for a VLS media set. The software download module 217 identifies the media files from the data structure 219 and one or more smart monitor that stores the identified media files. The identified smart monitors are then instructed to stream the media files to the smart monitors.

In another aspect, the system configuration tool 214 may be operated off board, such as at a media file processing center. Operation of the system configuration tool 214 off board the vehicle, i.e., as a ground tool for an aircraft, provides advantages in that usage data from all vehicles in a fleet may be received and processed to determine the category (or tier) to which a media file is assigned. Hence, for the system configuration tool 214 used off board a vehicle, the inputs 220A through 220N to the system configuration tool 214, come from each vehicle in the fleet operated by the transportation carrier.

In one aspect, the software configuration module 216 defines specific multicast-channel-group numbers (MCCGNs) for different categories/tiers of media files. In particular, MCCGN ranges are defined per media tier. For an aircraft, the MCCGN ranges correspond to different regions or areas of an aircraft IFE network. The software configuration module 216 assigns VLS media to a tier to a specific region within the tier. More particularly, media is assigned to a MCCGN from within the range of MCCGNs for that tier and region. A seat and a smart monitor corresponding to the seat therefore has set of MCCGNs assigned to that smart monitor. Therefore media, such as a film, within a VLS media subset is essentially assigned to a seat/smart monitor. In this regard, there is just one seat/smart monitor within a set of seats that hosts one instance of a VLS media set having the specific combination of MCCGNs for each tier. This may alternatively be viewed as specific smart monitors and specific MCCGNs being assigned to different regions or sections of the aircraft. The layout of the different regions will vary based on aircraft type, for example, narrow body aircraft, wide body aircraft and others, as described below in detail.

VLS Media Sets: In one aspect, a media library on a transportation vehicle includes a plurality of media files, for example, movies, audio files and others. The product of the number of files and size of the files determines the overall size of the VLS media library. The media library size is increased by grouping media files (for example, movies) into multiple, e.g., three (3) different categories or media tiers. The media categories for each media file may be stored as a media file attribute in data structure 219. The categories are indicative of a likelihood that a particular media file will be accessed more or less frequently by a certain number of passengers. In one aspect, media files for a transportation vehicle may be categorized into a plurality of tiers, X1, X2, X3, e.g. 100%, 50% and 25%. The 100% tier indicates that any media file within this category is guaranteed to be viewable/playable by all onboard passengers at the same time. The 50% tier indicates that any media file within this category is guaranteed to be viewable/playable by at least half of all onboard passengers at the same time. The 25% tier indicates that any media file within this category is guaranteed to be viewable by at least a quarter of all onboard passengers at the same time. This media file categorization or media tier concept, enables system 100 to increase the overall media library size without having to increase the physical storage capacity of the smart monitors or upgrading the processor capability of the smart monitors. It is noteworthy that the adaptive aspects of the present disclosure are not limited to 100%, 50% and 25% categories, and instead other categories maybe used.

Process 300: FIG. 3 shows a process flow 300 for providing operational software 309A and media files 309B to a smart monitor, according to one aspect of the present disclosure. The various process blocks of process 300 are executed by program logic executing the system configuration tool 214, described above with respect to FIG. 2B. The examples below are described with respect to an aircraft but are equally applicable to any type of transportation vehicle.

Process 300 begins in block B302, after a VLS media set has been configured to store various media files at various smart monitors, the operational software and the media files have been initially distributed and installed via interface 134 at various smart monitors. As an example, the media files are stored at different smart monitors based on the media file categories, e.g., C1/C2/C3. For example, C1 may be 100%, C2 may be 50% and C3 may be 25% category. A split ratio, i.e., S1/S2/S3 for the VLS is received from an entity that operates the transportation vehicle, e.g., an airline for an aircraft. For example, S1/S2/S3 may be 50/30/20, i.e., 50% of the available physical storage capacity of smart monitors is allocated to the 100% category, 30% of the available physical storage capacity of smart monitors is allocated to the 50% category and 20% of the available physical storage capacity of smart monitors is allocated for the 25% category. The VLSF for the transportation vehicle is also obtained. In one aspect, the VLSF depends on the smart monitor processor capabilities and a smart monitor's ability to stream media files to other smart monitors and the available network bandwidth. Thereafter, a plurality of VLS media sets are generated.

The number of VLS Media Sets to host the entire VLS Media Library depends on the number of categories for storing media files. For example, to accommodate 100/50/25 percent categories, four VLS media sets are used. Each VLS media set is configured with a plurality of VLS media subsets. The number of VLS media subset is a function of the VLSF. For example, if the VLSF is twenty (20), then each of the four VLS media sets is configured with twenty (20) VLS media subsets. A VLS Media Subset is assigned to one or more smart monitors. Each VLS Media Subset is comprised of the media files from the different categories and stored on the smart monitors. For example, in order to achieve the required guaranteed AVOD coverage, a media file that is identified to belong to the 100% category is present in each of the four (4) VLS media set. A media file in the 50% category is stored in two (2) out of the four (4) VLS media sets, while a media file in the 25% category is stored in just one (1) of the four (4) VLS media sets. This enables the system to expand the overall VLS media library size without increasing the storage capacity at the smart monitors or the processor ability by storing a greater number of media files that have various levels of guaranteed AVOD coverage, compared to a system where every media file is available to all the passengers at the same time.

In block B304, a first smart monitor 132 that needs operational software installation is detected. This may be detected when the system configuration tool 214 is executed on the aircraft or the ground. This may be detected when the smart monitor 132 is replaced at a particular seat or when a smart monitor is refurbished and has to be reset to factory standards. In another aspect, the operational software installation may be an upgrade for an existing version of the operational software.

In block B306, the system configuration tool 214 identifies one or more smart monitors that store the operational software in a downloadable configuration. This may be determined by the software download module 217 by querying the data structure 219. For redundancy, the software download module 217 identifies more than one smart monitor that stores the operational software. The software download module 217 then selects a smart monitor for providing the operational software to the smart monitor detected in block B304. In one aspect, the software download module 217 may use various parameters in selecting smart monitor for transmitting the operational software. Without limitation, the parameters include the overall processing capability of the smart monitor, whether the smart monitor is available to transmit the operational software, the physical location of the selected smart monitor or any other parameter that may improve transmission of the operational software. In one aspect, the software download module 217 obtains information regarding these various parameters from data structure 219.

In block B308, the identified smart monitor transmits the operational software to the first smart monitor. The operational software may be provided as a compressed zip file to ensure that it does not impact the overall network traffic. Thereafter, the operational software is installed at the first smart monitor.

In block B310, the system configuration tool 214 determines that the first smart monitor is a member of a VLS media set and needs to store one or more media files. The software download module 217 uses the data structure 219 to make that determination. The software download module 217 identifies the media files that need to be persistently stored by the first smart monitor. The software download module 217 also identifies one or more smart monitors that currently store the media files.

In block B312, the identified media files are transferred to the first smart monitor from the identified one or more smart monitors. In selecting the smart monitor(s) for transfer, the software download module 217 evaluates the proximity of the one or more smart monitors to the first smart monitor, the current usage of the one or more smart monitors, and the overall network traffic. The VLS download module is able to obtain information regarding these parameters from the data structure 219 as well as from other network monitoring applications (not shown) that may be executed at one or more devices. The transferred media files are persistently stored by the first smart monitor such that the first smart monitor can transfer the media files to other smart monitors, upon request.

Networking methods and systems are provided for a transportation vehicle. One method includes detecting operational software installation for a first seat device of a plurality of seat devices of the transportation vehicle to access an entertainment system of the transportation vehicle, the entertainment system comprising a plurality of media files stored within a virtual local storage (VLS) media set distributed across persistent storage of at least a portion of the plurality of seat devices without using persistent mass storage of a media server on the transportation vehicle; identifying at least a second seat device configured to store the operational software in a downloadable configuration; providing the operational software in the downloadable configuration to the first seat device; installing the operational software at the first seat device; determining that the first seat device is a member of the VLS media set, based on a location of the first seat at the transportation vehicle; transmitting a portion of the VLS media set from one or more seat devices to the first seat device; and persistently storing the portion of the VLS media set at the persistent storage of the first device.

Figure 4:
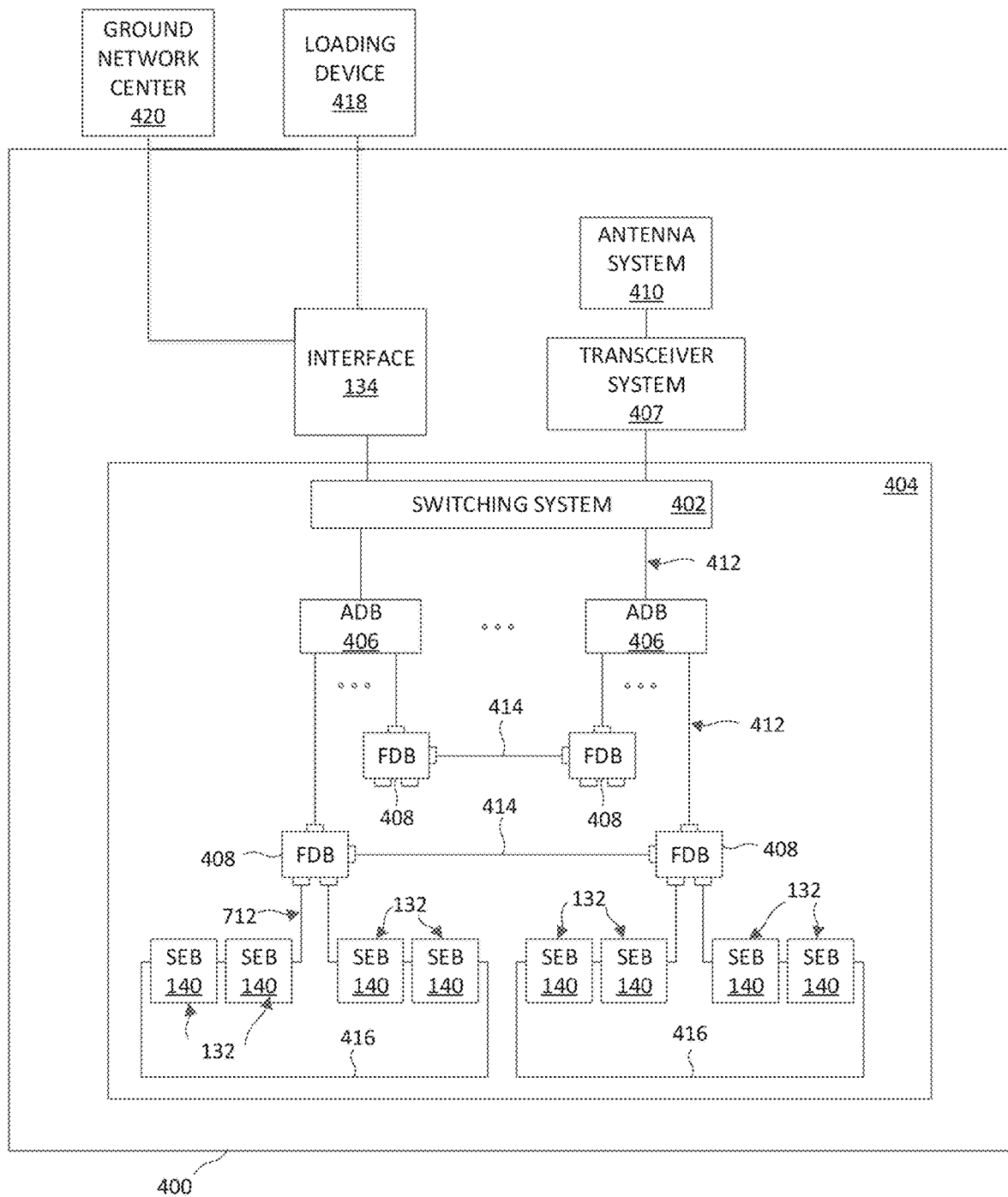
FIG. 4 is a block diagram of an example of a content distribution system for a vehicle.

Content Distribution System: FIG. 4 illustrates an example of a content distribution system 404 for a vehicle 400 for commercial mass passenger transport, such as an aircraft, ship, train, bus, ferry other vehicle. The examples described below are with respect to an aircraft but are equally applicable to other types of transportation vehicles.

The content distribution system 404 couples, and supports communication between a loading device 418, and a plurality of smart monitors 132. The loading device may be a portable loader, a USB/SDXC storage device or a device that can upload data wirelessly from the ground to the aircraft via a cell modem or a satellite connection. The loading device 418 is used to initially load media files to the vehicle 400 via the interface 134. It is noteworthy that a media server is not used to load the media files, instead the files are routed directly from the loading device 418 to various smart monitors via interface 134 and the content distribution system 404. In another aspect, the media files may be loaded directly from a ground network center 420 that includes one or more computing devices as well as persistent storage devices.

The content distribution system 404, for example, can be provided as a conventional wired and/or wireless communication network, as previously described. The distribution system 404 can be provided as a plurality of area distribution boxes (ADBs) 406, a plurality of floor disconnect boxes (FDBs) 408, and a plurality of seat boxes (SEBs) 140 as described earlier, and configured to communicate in real time via a plurality of wired and/or wireless communication connections 412. The distribution system 404 includes a switching system 402 for providing an interface between the distribution system 404 and the interface 134. The switching system 402 can comprise a conventional switching system, such as an Ethernet switching system, and is configured to couple the interface 134 with the ADBs 406. Each of the ADBs 406 is coupled with, and communicates with, the switching system 402. The switching system 402 is frequently referred to as a network controller. On some vehicles, for example, a narrow body aircraft, the switching system 402 may be integrated with the interface 134.

Each of the ADBs 406, is coupled with, and communicates with, at least one FDB 408. Although the ADBs 406 and the associated FDBs 408 can be coupled in any conventional configuration, the associated FDBs 408 preferably are disposed in a star network topology about a central ADB 406. Each FDB 408 is coupled with, and services, a plurality of daisy-chains of SEBs 140. The SEBs140, in turn, are configured to communicate with the smart monitors 132. Each SEB 140 can support one or more of the smart monitors 132.

The distribution system 404 can include at least one FDB internal port bypass connection 414 and/or at least one SEB loopback connection 416. Each FDB internal port bypass connection 414 is a communication connection 412 that permits FDBs 408 associated with different ADBs 406 to directly communicate. Each SEB loopback connection 416 is a communication connection 412 that directly couples the last SEB 140 in each daisy-chain of SEBs 140 for a selected FDB 408. Each SEB loopback connection 416 therefore forms a loopback path among the daisy-chained SEBs 140 coupled with the relevant FDB 408.

The content distribution system 404 may include an antenna system 410 and transceiver system 407 for communication with a source external to the vehicle, for example, a ground station or satellite, for providing an Internet connection. The switching system 402, the ADBs 406, the FDBs 408, the SEBs 140, the antenna system 410, the transceiver system 407, the interface 134, and other system resources are provided as line replaceable units, hereinafter referred to as "LRUs." The use of LRUs facilitate maintenance of the vehicle information system because a defective LRU can simply be removed and replaced with a new (or different) LRU. The defective LRU thereafter can be repaired for subsequent installation. Advantageously, the use of LRUs can promote flexibility in configuring the content distribution system 404 by permitting ready modification of the number, arrangement, and/or configuration of the system resources of the content distribution system 404. The content distribution system 404 likewise can be readily upgraded by replacing any obsolete LRUs with new LRUs.

In the content distribution system 404, the smart monitors 132 have content (media files/operational software) stored thereon as previously described in local content storage thereof. In particular, the system 404 includes smart monitors 132 disposed in the vehicle with each smart monitor including local content storage storing media files in which each smart monitor is configured to present media selections to passengers corresponding to the media files stored collectively together by the smart monitors. The system 404 includes a network connecting the smart monitors 132 in communication and program logic executed by each smart monitor.

The program logic, after a smart monitor receives an input from a passenger for one of the selections, performs tasks including determining if a media file corresponding to the passenger's input is available from local content storage of the smart monitor, and if available, playing the media file from the local content storage of the smart monitor 132. If the media file corresponding to the passenger's input is not available from the local content storage of the smart monitor, the logic determines if a media file corresponding to the selection is available from another smart monitor and if available, sourcing and playing the media file from the another smart monitor.

In system 100, when selecting another smart monitor 132 from which to stream the media file (e.g. in block B312, FIG. 3), the logic selects first another smart monitor connected to the same column, either 104 or 106 (see FIG. 1A). In system 404 (see FIG. 4), the logic selects first another smart monitor connecting to the same floor distribution box 408, and if not available next a monitor connecting to the same ADB 406. In a system having multiple switching systems 402, the next preference is a smart monitor that is in communication with the same switching system. If there are multiple choices available meeting the foregoing criteria, the smart monitor 132 selected is the one having the least number of active clients. This minimizes the distance travelled for network traffic while minimizing stress on smart monitors.

VLS Media Distribution: Conventional systems for downloading media files are inefficient because all multicast data streams have to go to all columns and smart monitors. The present disclosure provides for selective operational software and media distribution in which only certain multicast channels have to enter a given column, allowing for a greater distribution rate to the smart monitors. It is noteworthy that a column is the segment between a network controller and ADB 406. This may limit bandwidth of networks operating at a lower rate (e.g. SEB 140 to smart monitors 132) and hence loading media files may take an undesirable amount of time. The selective VLS media distribution technology provides an efficient networking solution for loading media files on smart monitors 132 of a vehicle entertainment system.

In one aspect, a VLS Media Library is first divided into multiple VLS media sets. The number of VLS media subsets per VLS media set is defined by the VLSF, as described above. Each VLS media subset is assigned to a smart monitor 132. The media files for each VLS Media Subset are selectively distributed to the smart monitors by maximizing the available bandwidth of a cabin distribution network (404, FIG. 4).

To reduce the VLS media (or operational software) distribution time to the smart monitors 132, the adaptive processes and systems described herein use multicast channel group numbers (MCCGN) that are assigned to media files. In one aspect, an aircraft is subdivided into multiple regions, where each region may have one or more columns with the smart monitors 132 of each column all belonging to the same region. Each column is assigned media files/operational software that are assigned specific MCCGNs. Each column registers its MCCGNs with an upstream switch (e.g. ADB 406, FIG. 4). This may be implemented using an IGMP "join" operation. A join operation is a request, from a SEB 140 to an ADB 406 to join a multicast group with specific MCCGNs. The ADB 406 stores the MCCGN in a routing table at a switch memory (not shown).

When a switch (e.g. ADB 406) receives media files, the switch forwards received data packets comprising the media files (or operational software) to an egress (port). Since the packets are received from multicast data streams, only data packets of multicast channel number that downstream smart monitors 132 subscribed to forwarded by the switch to that specific port. In this regard, a table is used by the switch to direct traffic for registered MCCGNs to specific ports. This enables multicast data streams to be distributed to smart monitors 132 at a high rate.

In one aspect, the VLS media subsets and operational software are assigned by the software configuration module 216 (FIG. 2B) to smart monitors based on aircraft configuration and layout. When media files are promoted or demoted between media tiers, the media files are assigned different MCCGNs and stored at the smart monitors using newly assigned MCCGNs.

Figure 5:
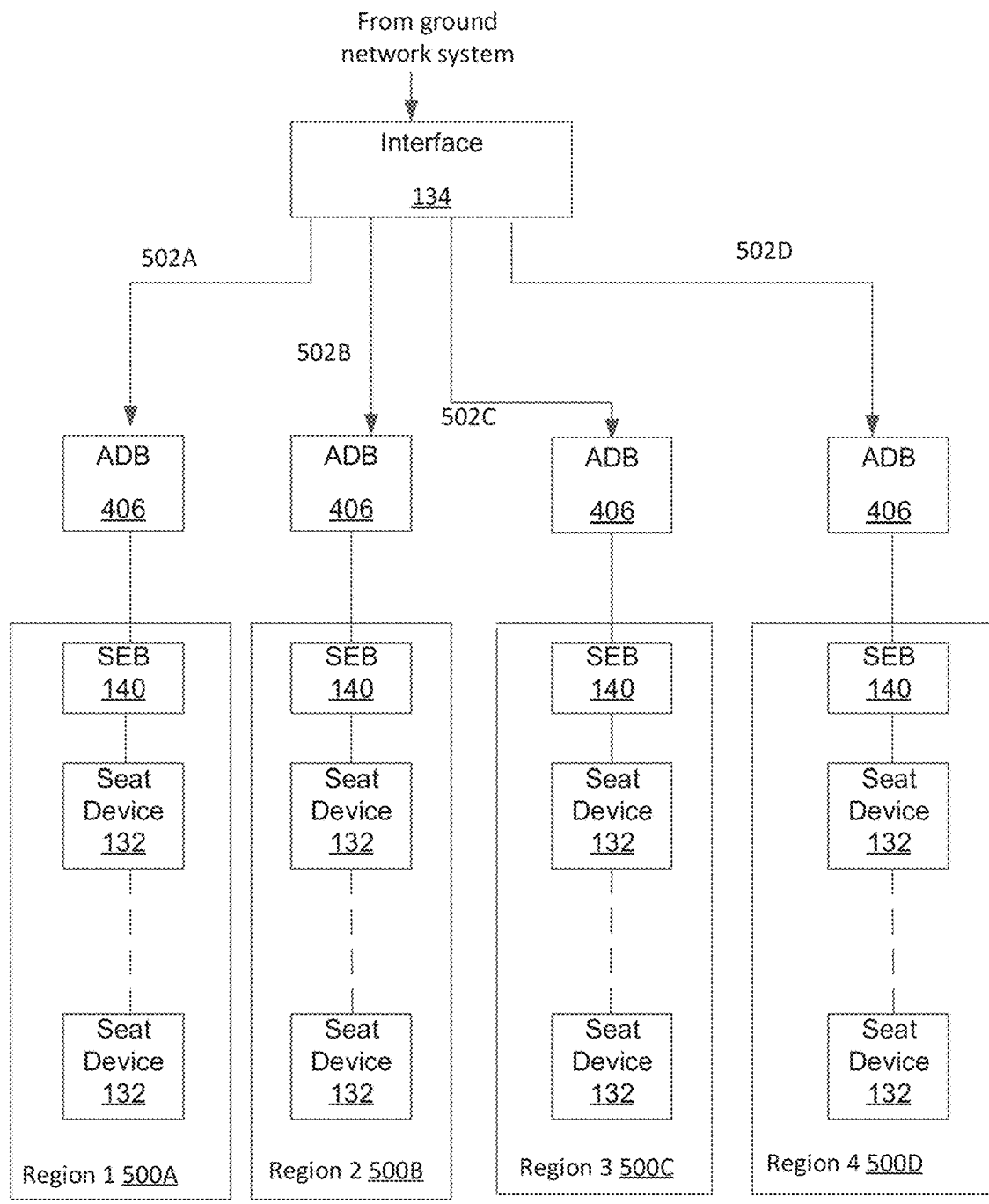
FIG. 5 shows an example of streaming media and operational software on an aircraft, according to one aspect of the present disclosure.

FIG. 5 shows a simplified layout for a wide-body aircraft with a plurality of ADBs 406. The aircraft is divided into multiple regions, for example, regions 500A-500D. Each region has one or more SEBs 140 with seat devices 132. A ground system (e.g. the portable loader 418) initially provides multimedia files and operational software (jointly referred to as data) to the smart monitors via interface 134 that is connected to ADBs 406 via fiber connections that are faster than the bandwidth of each region/column, which is typically, copper based. Data 502A-502D may be sent via interface 134 at 10G via fiber media, while data from ADBs 406 to each region may be delivered at 2.5G. ADBs 406 segregate the data streams 502A-502D based on assigned MCCGNs for each region, as described earlier. The ADBs 406 then transmit data to each SEB based on the registered MCCGNs. Therefore, the SEBs only receive data that the smart monitors must store in a specific column compared to conventional systems where the SEBs may receive the entire media library.

Figure 6:
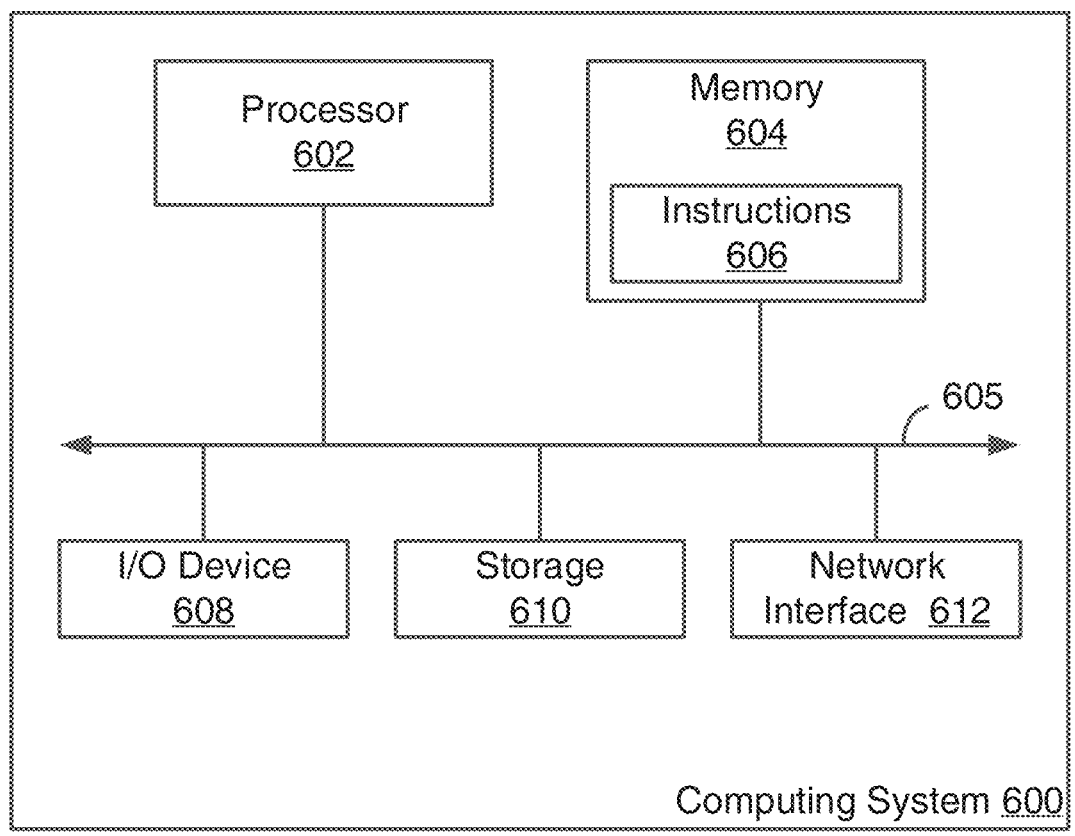
FIG. 6 shows a block diagram of a computing system, according to one aspect of the present disclosure.

Processing System: FIG. 6 is a high-level block diagram showing an example of the architecture of a processing system 600 that may be used according to one aspect. The processing system 600 as an example can represent a computing device including smart monitors and overhead monitors, for hosting and executing the system configuration tool 214. Note that certain standard and well-known components which are not germane to the present aspects are not shown in FIG. 6.

The processing system 600 includes one or more processor(s) 602 and memory 604, coupled to a bus system 605. The bus system 605 shown in FIG. 6 is an abstraction that represents any one or more separate physical buses and/or point-to-point connections, connected by appropriate bridges, adapters and/or controllers. The bus system 605, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 602 are the central processing units (CPUs) of the processing system 600 and, thus, control its overall operation. In certain aspects, the processors 602 accomplish this by executing software instructions stored in memory 604. A processor 602 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 604 represents any form of random access memory (RAM), read-only memory (ROM), flash memory, or the like, or a combination of such devices. Memory 604 includes the main memory of the processing system 600. Instructions 606 may be used to implement the process steps of FIG. 3 described above.

Also connected to the processors 602 through the bus system 605 are one or more internal mass storage devices 610, and a network interface 612. Internal mass storage devices 610 may be, or may include any conventional medium for storing large volumes of data in a non-volatile manner, such as one or more magnetic, optical, or semiconductor based disks.

The network interface 612 provides the processing system 600 with the ability to communicate with remote devices (e.g., over a network) and may be, for example, an Ethernet adapter or the like.

The processing system 600 also includes one or more input/output (I/O) devices 608 coupled to the bus system 605. The I/O devices 608 may include, for example, a display device, a keyboard, a mouse, etc.

Innovative technology for a vehicular entertainment system has been described in the foregoing paragraphs. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
    detecting operational software installation for a first seat device of a plurality of seat devices of a transportation vehicle to access an entertainment system of the transportation vehicle, the entertainment system comprising a plurality of media files stored within a virtual local storage (VLS) media set distributed across persistent storage of at least a portion of the plurality of seat devices without using persistent mass storage of a media server on the transportation vehicle;
    selecting at least a second seat device from a subset of the plurality of seat devices configured to store the operational software in a downloadable configuration, based on the second seat device's availability to transmit the operational software and processing capability;
    providing the operational software in the downloadable configuration to the first seat device;
    installing the operational software at the first seat device;
    determining that the first seat device is a member of the VLS media set, based on a location of the first seat at the transportation vehicle;
    transmitting a portion of the VLS media set from one or more seat devices to the first seat device; and
    persistently storing the portion of the VLS media set at the persistent storage of the first device; wherein the operational software and the portion of the VLS media set are made available for streaming from the first seat device to another seat device of the plurality of seat devices.

2. The method of claim 1, wherein the operational software installation is executed to integrate the first seat device within the entertainment system.

3. The method of claim 1, wherein the transportation vehicle is an aircraft.

4. The method of claim 3, wherein an aircraft interface initially routes the plurality of media files to the plurality of seat devices without using the media server.

5. The method of claim 4, wherein the aircraft interface uses multicast channel group numbers (MCCGNs) for routing the plurality of media files to the plurality of seat devices.

6. The method of claim 3, wherein the operational software installation is detected when the first seat device is brought on-line.

7. The method of claim 3, wherein the second seat device is based on a location of the second seat device within the aircraft.

8. A non-transitory machine readable medium having stored thereon instructions, comprising machine executable code which when executed by a machine, causes the machine to:
    detect operational software installation for a first seat device of a plurality of seat devices of a transportation vehicle to access an entertainment system of the transportation vehicle, the entertainment system comprising a plurality of media files stored within a virtual local storage (VLS) media set distributed across persistent storage of at least a portion of the plurality of seat devices without using persistent mass storage of a media server on the transportation vehicle;
    select at least a second seat device from a subset of the plurality of seat devices configured to store the operational software in a downloadable configuration, based on the second seat device's availability to transmit the operational software and processing capability;
    provide the operational software in the downloadable configuration to the first seat device;
    install the operational software at the first seat device;
    determine that the first seat device is a member of the VLS media set, based on a location of the first seat at the transportation vehicle;
    transmit a portion of the VLS media set from one or more seat devices to the first seat device; and
    persistently store the portion of the VLS media set at the persistent storage of the first device; wherein the operational software and the portion of the VLS media set are made available for streaming from the first seat device to another seat device of the plurality of seat devices.

9. The non-transitory machine readable medium of claim 8, wherein the operational software installation is executed to integrate the first seat device within the entertainment system.

10. The non-transitory machine readable medium of claim 8, wherein the transportation vehicle is an aircraft.

11. The non-transitory machine readable medium of claim 10, wherein an aircraft interface initially routes the plurality of media files to the plurality of seat devices without using the media server.

12. The non-transitory machine readable medium of claim 11, wherein the aircraft interface uses multicast channel group numbers (MCCGNs) for routing the plurality of media files to the plurality of seat devices.

13. The non-transitory machine readable medium of claim 10, wherein the operational software installation is detected when the first seat device is brought on-line.

14. The non-transitory machine readable medium of claim 10, wherein the second seat device is selected based on a location of the second seat device within the aircraft.

15. A system, comprising:
 a plurality of seat devices of a transportation vehicle to access an entertainment system of the transportation vehicle, the entertainment system comprising a plurality of media files stored within a virtual local storage (VLS) media set distributed across persistent storage of at least a portion of the plurality of seat devices without using persistent mass storage of a media server on the transportation vehicle; and
 a processor coupled to a memory to execute machine executable code to:
 detect operational software installation for a first seat device of the plurality of seat devices;
 provide the operational software in the downloadable configuration to the first seat device from a second device from a subset of the plurality of seat devices configured to store the operational software in a downloadable configuration, based on the second seat device's availability to transmit the operational software and processing capability;
 install the operational software at the first seat device;
 determine that the first seat device is a member of the VLS media set, based on a location of the first seat at the transportation vehicle;
 transmit a portion of the VLS media set from one or more seat devices to the first seat device; and
 persistently store the portion of the VLS media set at the persistent storage of the first device; wherein the operational software and the portion of the VLS media set is made available for streaming from the first seat device to another seat device of the plurality of seat devices.

16. The system of claim 15, wherein the transportation vehicle is an aircraft.

17. The system of claim 16, wherein an aircraft interface initially routes the plurality of media files to the plurality of seat devices without using the media server.

18. The system of claim 17, wherein the aircraft interface uses multicast channel group numbers (MCCGNs) for routing the plurality of media files to the plurality of seat devices.

19. The system of claim 15, wherein the operational software installation is detected when the first seat device is brought on-line.

20. The system of claim 15, wherein the second seat device is selected based on a location of the second seat device within the aircraft.

* * * * *